(12) United States Patent
Haevescher et al.

(10) Patent No.: US 12,128,963 B2
(45) Date of Patent: Oct. 29, 2024

(54) ROTARY CONTROL DEVICE FOR STEERING

(71) Applicant: ZF FRIEDRICHSHAFEN AG, Friedrichshafen (DE)

(72) Inventors: Rainer Haevescher, Stemwede (DE); Artur Neumann, Kalletal (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/641,125

(22) PCT Filed: Sep. 10, 2020

(86) PCT No.: PCT/EP2020/075283
§ 371 (c)(1),
(2) Date: Mar. 8, 2022

(87) PCT Pub. No.: WO2021/048254
PCT Pub. Date: Mar. 18, 2021

(65) Prior Publication Data
US 2022/0332359 A1  Oct. 20, 2022

(30) Foreign Application Priority Data
Sep. 12, 2019 (DE) .................... 10 2019 213 958.2

(51) Int. Cl.
*B62D 5/00*  (2006.01)
*B62D 1/22*  (2006.01)
(Continued)

(52) U.S. Cl.
CPC ............... *B62D 5/006* (2013.01); *B62D 1/22* (2013.01); *G05G 5/03* (2013.01); *G05G 5/05* (2013.01); *G05G 2505/00* (2013.01)

(58) Field of Classification Search
CPC .......................... B62D 1/22; G05G 2505/00
See application file for complete search history.

(56) References Cited

U.S. PATENT DOCUMENTS 5,683,615 A   11/1997  Munoz
5,705,085 A   1/1998   Munoz et al.
(Continued)

FOREIGN PATENT DOCUMENTS

CN   101291840 A   10/2008
CN   108372883 A   8/2018
(Continued)

OTHER PUBLICATIONS

PCT International Search Report for corresponding International Application Serial No. PCT/EP2020/075283, dated Aug. 12, 2020, pp. 1-2.
(Continued)

*Primary Examiner* — Vicky A Johnson
(74) *Attorney, Agent, or Firm* — ROSSI, KIMMS & McDOWELL LLP

(57) ABSTRACT

The invention relates to a rotary control device (1) for steering a vehicle comprising a user interface surface (3), in particular a knob, that is embodied to rotate with respect to a housing (5) of the device (1) around a rotational axis (7) of the device (1), further comprising a sensor unit (9) for monitoring the orientation and/or rotational movement of the user interface surface (3) with respect to the housing (5), a processing unit (11), and a communications interface (13) for transmitting control signals (Ts) according to an output (Op) from the processing unit (11), said output (Op) being generated by the processing unit (11) on the basis of sensor data (Ds) from the sensor unit (9).

20 Claims, 4 Drawing Sheets

(51) Int. Cl.
  *G05G 5/03* (2008.04)
  *G05G 5/05* (2006.01)

(56) References Cited

U.S. PATENT DOCUMENTS

| | | |
|---|---|---|
| 6,557,662 B1 | 5/2003 | Andonian et al. |
| 2001/0052893 A1 | 12/2001 | Jolly et al. |
| 2002/0108804 A1 | 8/2002 | Park et al. |
| 2003/0187558 A1* | 10/2003 | Zheng ............... B62D 6/008 180/443 |
| 2005/0082107 A1 | 4/2005 | Husain et al. |
| 2006/0200291 A1 | 9/2006 | Wroblewski |
| 2008/0275608 A1 | 11/2008 | Campo et al. |
| 2011/0181405 A1 | 7/2011 | Periquet et al. |
| 2012/0217083 A1 | 8/2012 | Brickner |
| 2016/0216763 A1* | 7/2016 | Vanhelle ............ G06F 3/0362 |
| 2016/0378131 A1* | 12/2016 | Battlogg ............ F16H 59/0217 74/553 |

FOREIGN PATENT DOCUMENTS

| | | |
|---|---|---|
| DE | 102004050014 A1 | 6/2005 |
| DE | 102010029184 A1 | 11/2011 |
| DE | 102017210442 A1 | 12/2018 |
| DE | 102018222235 A1 | 6/2020 |
| EP | 1211159 A1 | 6/2002 |
| EP | 2065614 A1 | 6/2009 |
| JP | 2005500940 A | 1/2005 |
| KR | 100836173 B1 | 6/2008 |

OTHER PUBLICATIONS

Written Opinion issued in Intl. Appln. No. PCT/EP2020/075283 mailed Dec. 8, 2020.
Search Report issued in German Appln. No. 102019213958.2 dated Aug. 17, 2021.
Office Action issued in Chinese Appln. No. 202080064109.5 mailed Jun. 14, 2023. English translation provided.
Office Action issued in Chinese Appln. No. 202080064109.5 mailed Jan. 12, 2024. English translation provided.

* cited by examiner

ROTARY CONTROL DEVICE FOR STEERING

RELATED APPLICATIONS

This application is a U.S. National Stage Application filed under 35 USC 371, claiming priority to Serial No. PCT/EP2020/075283, filed on 10 Sep. 2020; which claims priority from German Patent Application DE 10 2019 213 958.2, filed 12 Sep. 2019, the entireties of which are hereby incorporated herein by reference.

TECHNICAL FIELD

The invention relates to a rotary control device for steering a vehicle, comprising a magnetorheological actuator for manipulating a braking moment incident on a rotatable part of the rotary control device. Haptic interfaces for control are known for example from the European patent publication EP2065614A1, wherein an assembly for manipulating properties of a magnetic field is disclosed for the purpose of modulating the torque transfer between a rotational element and a housing of the haptic interface. The patent publication documents US2016/0378131A1, US2016/0216763A1, and US2011/0181405A1 disclose further such control devices, generally suitable for use in automobiles.

BACKGROUND

Furthermore, the German patent publication DE10 2010 029 184 A1 discloses a rotary control device that can be used to select operation modes, such as a forward drive operation mode or a reverse operation mode of a vehicle as well as to steer the vehicle. The still unpublished German patent application DE10 2018 222 235 from the applicant discloses a rotary control device for steering, wherein said device comprises a magnetorheological actuator for simulating the haptic response of a traditional steering wheel in the rotary control device. The text of this earlier application is largely incorporated in this application. Additionally, the U.S. Pat. No. 6,557,662 B1 describes a traditional steering wheel converted to a steer by wire device comprising a magnetorheological actuator. However, the present application involves a rotary control element smaller in diameter than a human hand, or smaller than 10 cm in diameter, and traditionally located in the middle console of a vehicle or integrated into a cluster of controls on the dashboard, and can be seen as an alternative to a steering wheel, or in the case of a largely autonomously driving vehicle, a means of limited intervention into the steering of a vehicle for rare situations where it becomes necessary.

SUMMARY

The object of the invention is to introduce a further improved rotary control device suitable for steering a vehicle in the absence of a traditional steering wheel.

The object of the invention is achieved by a rotary control device defined by the subject matter of the independent claim. The dependent claims and the description define advantageous embodiments of the system.

The object is therefore achieved by a rotary control device for steering a vehicle, comprising a magnetorheological actuator for manipulating a braking moment of the magnetorheological actuator incident on a rotatable part of the rotary control device, wherein the magnetorheological actuator is embodied to manipulate the braking moment on the basis of vehicle state information received by the device, such that when the vehicle is moving at a velocity less than a predetermined velocity and when traction guiding parts of a vehicle, in particular wheels, are aligned with a forward-reverse axis of the vehicle, a change in the braking moment is reduced or increased.

A rotary control device comprising this functionality is advantageous over previously disclosed devices, because in low speed or stand still driving situations it is beneficial for a user or operator or driver of a vehicle to be able to locate and effect a central alignment of the wheels of the vehicle. At speeds above walking speed, such as 5 or 10 kilometers an hour, it is possible to for an operator or driver to ascertain this central alignment by observing the effects on the vehicle caused by rotating the rotary control device. However, in a parked or low speed situation, the driver cannot ascertain when this central alignment is reached, either because the vehicle is not moving or because the changes in direction are imperceptible at low speeds below 5 or 10 kilometers and hour. Embodying the magnetorheological actuator to provide a central latching point, or change in haptic, at the rotational orientation, which corresponds to this central alignment, i.e. along a forwards-reverse axis of the vehicle therefore permits said user/driver to quickly obtain this point of reference.

A primary orientation of the rotatable part or user interface surface is an orientation at which the communications interface (13) transmits a control signal (Ts) for aligning traction guiding parts of a vehicle, in particular wheels, such that the vehicle is guided in a direction defined by a forwards-reverse axis of the vehicle and/or in a direction corresponding to the current direction of momentum of the vehicle and/or a corresponding current orientation of the rotatable part of the magnetorheological actuator when the traction guiding parts of the vehicle, in particular wheels, are aligned with the forwards-reverse axis of the vehicle.

In an embodiment the rotary control device for steering a vehicle further comprises a user interface surface that is embodied to rotate with respect to a housing of the device around a rotational axis of the device, and further comprises a sensor unit for monitoring the orientation and/or rotational movement of the user interface surface with respect to the housing, a processing unit, and a communications interface for transmitting control signals according to an output from the processing unit and receiving vehicle state information, said output being generated by the processing unit on the basis of sensor data from the sensor unit, wherein the rotary control device further comprises a magnetorheological actuator having a rotational element that is mechanically connected to the user interface surface, wherein the user-torque required to rotate the user interface surface is dependent on properties of a magnetic field applied in the magnetorheological actuator, wherein the magnetorheological actuator is embodied to generate and/or manipulate the properties of the magnetic field according to governing signals from the processing unit, and wherein the processing unit generates the governing signals on the basis of vehicle state information received by the communications interface.

The vehicle state information comprises, for example, information about the current alignment of the traction guiding parts, or wheels.

The rotary control device can therefore be embodied such that the processing unit is embodied to output governing signals for governing the assembly such that the assembly manipulates the magnetic field in way that causes the braking moment of the magnetorheological actuator to simulate the braking moments of a conventional steering wheel while additionally proving a reference point for the central alignment of the wheels at low speeds or when in park. This advantageously reduces the cognitive fatigue of an operator and also provides a haptic response for an operator, which permits a steering function of the rotary control device to be used without needing to look at the device while using it. This permits an operator the freedom to continually observe the vehicle surrounds while guiding the vehicle.

The device can be used to select an operation mode of the vehicle, which is for example a forwards drive operation mode wherein torque is transferred from a drive unit of the vehicle in order to propel the vehicle in a forwards direction, a reverse drive operation mode wherein torque is transferred from a drive unit of the vehicle in order to propel the vehicle in a reverse direction, a neutral operation mode wherein no torque is transferred from a drive unit of the vehicle, a park operation mode where a torque transmission unit attached to the drive unit of the vehicle is mechanically blocked, or another operation mode.

The integration of a steering functionality, functionality for selecting and operation mode of the vehicle, and/or controlling other safety relevant functions, and/or operating a navigation menu, infotainment menu, or other functions permits a reduction in the number of operation devices or buttons required in a vehicle. Further, a rotary control device comprising steering functionality can serve as the exclusive means of steering the vehicle, especially in a highly autonomous driving mode, for example in a level 4 mode, where an operator is only occasionally required to steer the vehicle.

A safety relevant function of the vehicle in the sense of the invention can be for example the selection of an operation mode of the vehicle, steering, accelerating or braking the vehicle. A non-safety function of the vehicle can be for example navigation or control of a multimedia interface.

A communications pathway in the sense of the invention can be for example a hardline for transferring data such as a databus and/or a wireless data transmission channel. In many modern street vehicles, a CAN-databus is a preferred type of communications pathway.

The user interface surface, or knob, in the sense of the invention can comprise the outer surface of a ring shaped and/or half shell shaped structure, which is accessible to an operator, i.e. user, of the vehicle. The user interface surface can further comprise a construction underlying the outer surface of the user interface surface.

In an embodiment of the rotary control device the processing unit generates said governing signals based at least partially on information regarding vehicle velocity, acceleration, and/or wheel position, wherein the communications interface is embodied to receive said information and provide said information to the processing unit.

In an embodiment of the rotary control device the processing unit generates said governing signals based at least partially on sensor information generated by the sensor unit regarding a variation of the orientation of the user interface surface from a primary orientation of the user interface surface, said primary orientation being an orientation at which the communications interface transmits a control signal for aligning traction guiding parts of a vehicle, in particular wheels, such that the vehicle is guided in a direction defined by a forwards-reverse axis of the vehicle and/or in a direction corresponding to the current direction of momentum of the vehicle.

In an embodiment of the rotary control device when a torque is applied externally to the user interface surface for rotating the user interface surface to an orientation varying from the primary orientation, the processing unit generates governing signals such that the magnetorheological actuator generates and/or manipulates the properties of the magnetic field to increase the torque transfer between the user interface surface and the housing.

In an embodiment of the rotary control device the rotary control device further comprises a servo actuator that is embodied to apply torque directly and/or indirectly to the user interface surface in accordance with said governing signals output by the processing unit.

In an embodiment of the rotary control device when a torque is applied externally to the user interface surface for rotating the user interface surface to an orientation varying from the primary orientation the servo actuator serves to apply a torque in a direction opposite of the rotational movement, in a rotational direction of the primary orientation, such that when the manually applied torque is removed, the user interface surface rotates to the primary orientation.

When a position and/or orientation of the user interface surface remains constant in the absence of a force applied the device from an external source, then this position and/or orientation of the user interface surface can be referred to as a stable position. On the other hand, when the user interface surface does not remain in a certain position or orientation, because for example a mechanism of the device applies a force internally, then this position and/or orientation can be referred to as being non-stable.

A position of the user interface surface in the sense of the invention refers to the placement of the user interface surface within a plane spatially displaced from the housing of the device by a specified distance. An orientation of the user interface surface in the sense of the invention refers to a rotational displacement of the user interface surface around the rotational axis of the device by a specific degree of rotation with respect to an initial setting of the user interface surface with reference to the housing.

In an embodiment of the rotary control device the magnetorheological actuator comprises a rotational element that is mechanically connected to the user interface surface and serves to interact with a magnetorheological fluid of the magnetorheological actuator, and wherein the magnetorheological actuator comprises an assembly for generating and/or manipulating properties of a magnetic field acting on the magnetorheological fluid for modulating torque transmission between the user interface surface and the housing.

The state of the magneto-rheological fluid of the device defines the torque transmission properties of the rotary control device. To influence the state of the fluid, a voltage is supplied to the assembly and varied to induce changes in a surrounding magnetic field that affects the viscosity of the fluid. Depending on the magnetic field, in particular depending on properties of the magnetic field such as intensity and/or direction, the MRF can vary between liquid and solid state. These changes can be controlled very accurately. In a fluid state, MRF transfers little to no torque between the rotational element and the housing. However, as the viscosity increases and the fluid approaches a solid state, the sheer forces within the fluid and between the fluid and the rotational element as well as between the fluid and the housing, or a component attached fixedly to the housing, increases. This in turn increases torque transfer between the user interface surface and the housing.

In an embodiment of the rotary control device the processing unit is embodied to output governing signals for governing the assembly for generating and/or manipulating the properties of the magnetic field on the basis of sensor data from the sensor unit In an embodiment of the rotary control device the sensor unit of the device further comprises a sensor for monitoring the torque applied to the user interface surface.

In an embodiment of the rotary control device the sensor unit of the device further monitors the acceleration of the rotational movement of the user interface surface with respect to the housing.

In an embodiment of the rotary control device the rotational element comprises a chamber containing the magnetorheological fluid, and in that a static element is provided, which is fixedly arranged with respect to the housing and arranged at least partially within the chamber, such that the torque transmission between inner surface of the chamber of the rotational element and the static element is dependent on the properties of a magnetic field.

In an embodiment of the rotary control device the rotational element is embodied to rotate within a chamber of the actuator containing the magnetorheological fluid, said chamber being fixedly arranged with respect to the housing, such that the torque transmission between the rotational element and an inner surface of the chamber is dependent on the properties of a magnetic field.

In an embodiment of the rotary control device a spring element provided, and in that a connecting element is provided serves to detachably connect the user interface surface with the housing via the spring element when the rotary control device is in a steering mode, such that a rotational force applied to the device externally is stored in the spring element and when the external force is removed, the energy is released as a rotational force for rotating the user interface surface back to the primary position.

BRIEF DESCRIPTION OF THE DRAWINGS

Certain embodiments of the invention will next be explained in detail with reference to the following figures. They show.

DESCRIPTION

Figure 1:
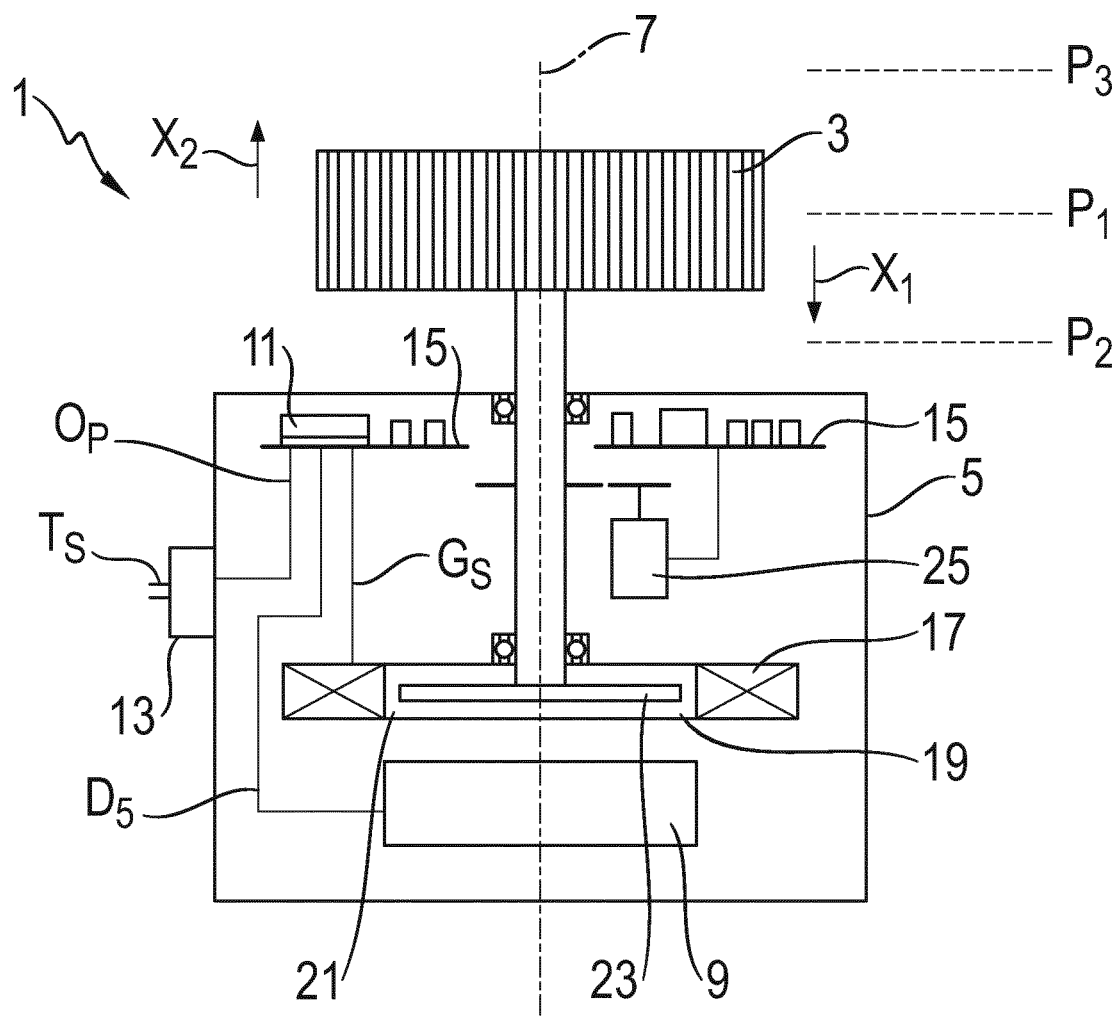
FIG. 1 a schematic diagram of an embodiment of the inventive rotary control device.

FIG. 1 shows a schematic diagram of an embodiment of the inventive rotary control device 1 having a user interface surface 3, which can be moved and rotated by a user or operator of a vehicle. The user interface surface can be rotated around a rotational axis 7 of the device 1 to various orientations A1. The user interface surface 3 can furthermore be moved by a user or operator of the vehicle between a first, second and third position P1, P2, P3.

The device 1 comprises a housing 5, which at least partially encloses a processing unit 11 mounted on a substrate 15, which is a printed circuit board. The processing unit 11 is connected to a communications interface 13. Via the communications interface 13 signals such as control signals Ts can be transmitted and received. The processing unit 11 is further connected to a sensor unit 9 which serves to monitor the rotational movement and/or orientation of the user interface surface with respect to the housing 5. The sensor unit 9 transmits sensor data Ds to the processing unit 11 and on the basis of this sensor data Ds, the processing unit 11 can generate control signals to transmit via the communications interface 13.

The device further comprises an assembly 17 for generating and manipulating a magnetic field in a chamber 19 of the housing 5. The chamber contains a magnetorheological fluid 21 also known as MRF. Positioned partially within the chamber is a rotational element 23. The rotational element 23 is mechanically connected to the user interface surface 3 and rotates with the rotation of the interface 3.

Corresponding to changes in properties of the magnetic field caused by the assembly 17, such as field strength and direction, the magnetorheological fluid 12 varies in viscosity so to speak. Therefore, in a corresponding way, the fluid transfers more or less torque between the user interface surface 3 and the housing 5 of the device 1. This is due to the changing sheer forces within the fluid and between the fluid and the chamber wall. Since the housing 5 of the device is generally fixedly mounted within the vehicle, the assembly can be considered to modulate a sort of braking force acting on the user interface surface 3. Such systems comprising MRF 21 in a chamber 19, rotational elements 23, and assemblies 17 for manipulating the magnetic field within the chamber 19 are often referred to as MRF-Actuators. The processing unit 11 is embodied to output governing signals for controlling the assembly 17. The assembly 17 can, for example, be driven by a circuit on the substrate 15 feeding the assembly 17 with a pulsed width modulated (PWM) current or voltage in accordance with the governing signals from the processing unit 11.

The device further comprises a servo actuator 25, which engages with the rotational element 23 and can therefore apply torque to the user interface surface 3. When a steering mode of the rotary control device 1 is active, the servo actuator 25 can apply torque to the user interface surface 3 in accordance with governing signals received from the processing unit. The processing unit 11 can generate these control signals on the basis of vehicle data supplied to it via the communications interface 13. This vehicle data can comprise wheel alignment information, speed information, chassis information, and so on, but also information regarding the current orientation of the user interface surface 3 and information about a torque currently being applied externally by a user, for example. Based on this information, the processor 11 can generate governing signals that cause the servo actuator 25 to apply torque such that a haptic response to the rotary control device 1 is conferred to the user or operator, simulating the active haptic response a conventional steering wheel would provide. For example, when the vehicle runs over a pothole at a certain speed while turning, the wheels are affected, and this effect can traditionally be monitored and corrected by a driver holding the steering wheel. In a steer by wire system, these effects must be generated by an actuator system such as the one shown here, to provide the operator with a chance to make corrections.

Figure 2:
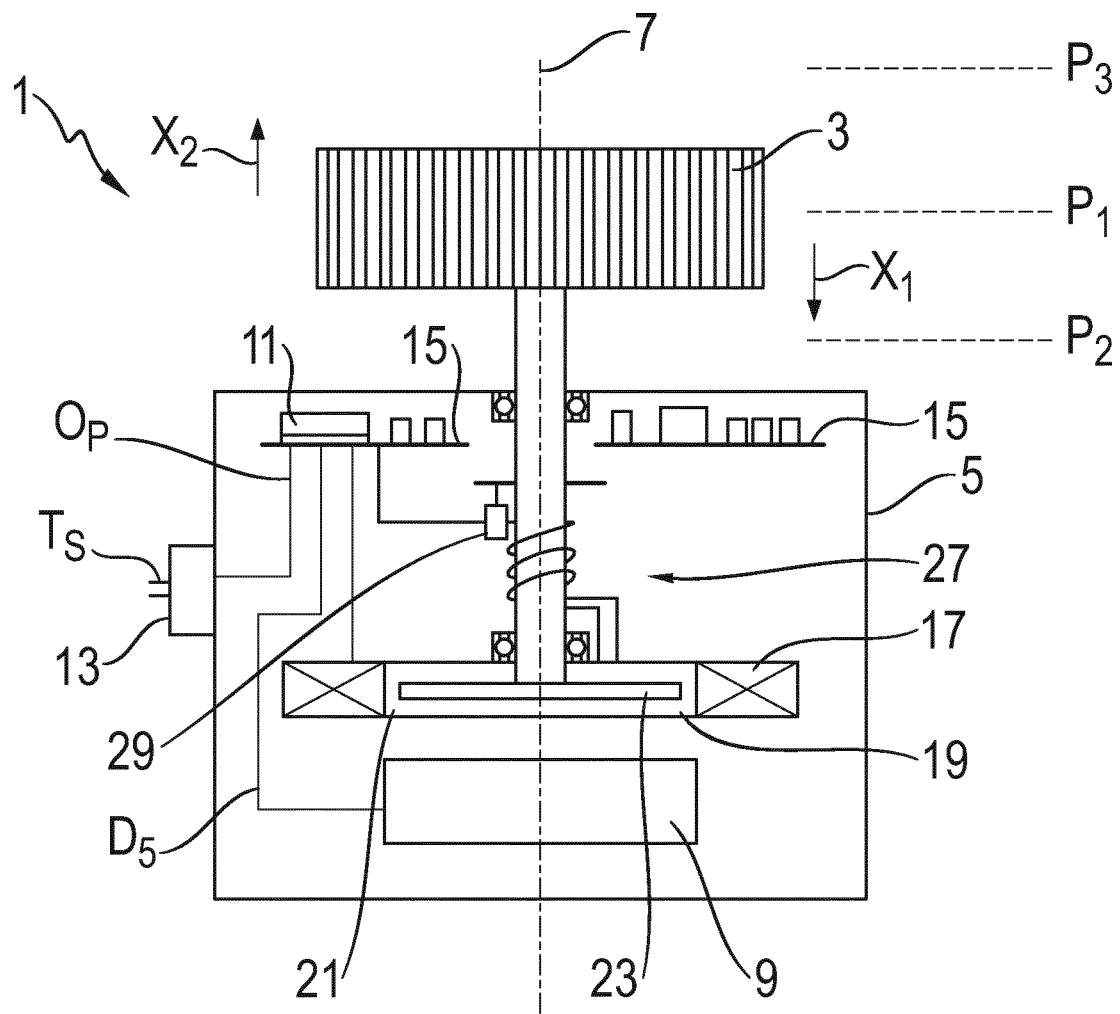
FIG. 2 a schematic diagram of an embodiment of the inventive rotary control device.

FIG. 2 shows a schematic diagram of a second embodiment of the inventive rotary control device, wherein no servo actuator 25 for providing an active haptic influence on the user interface surface 3. Instead, the rotary control device 1 comprises a spring element 27. The spring element 27 can be mechanically connected and disconnected to a rotational element connected to the user interface surface 3 via an attaching element 29. The attaching element 29 can comprise a lifting magnet with a pin for example. When the rotary control device 1 is in a steering mode, the spring element 27 attaches to the rotational element 23 and serves to create a restoring force on the user interface surface 3, such that in the absence of an external force, the rotary control device returns to a primary orientation, thereby simulating the behavior of a traditional steering wheel.

Figure 3:
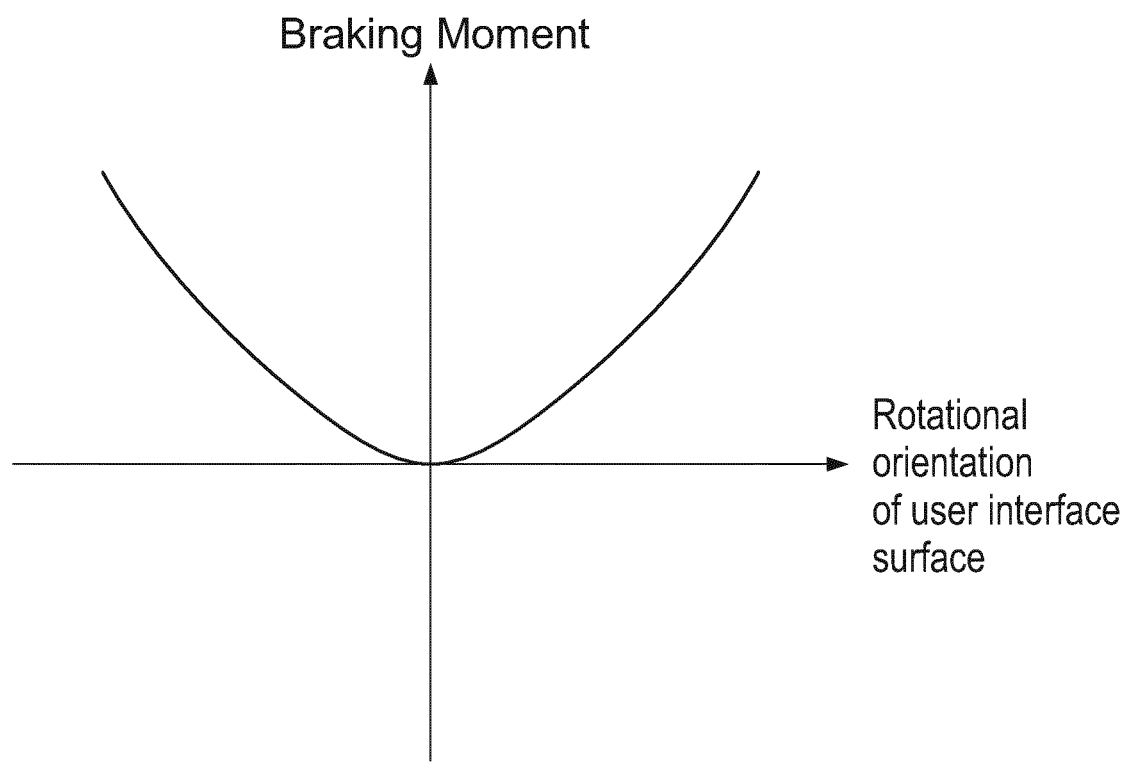
FIG. 3 a force progression diagram according to an embodiment of the inventive rotary control device.

FIG. 3 shows a force progression diagram according to an embodiment of the inventive rotary control device 1, wherein the torque applied to the user interface surface 3 in the direction of the primary orientation is shown as a function of the difference in alignment between the momentum vector of the vehicle and the direction of the wheels. When the wheels and the momentum of the vehicle are aligned, the a servo actuator 25 is not required to apply a large torque because in a conventional steering wheel would not, under these circumstances, pull back to the middle, generally because the a wheel under such circumstances is already approximately in a primary orientation when the vehicle is moving the direction of the wheels.

When a the rotary control device 1 is rotated away from the primary position and sends controls signals to steering actuators such that the wheels misalign with a current direction of momentum, then the actuating force of the servo actuator 25 rises.

Figure 4:
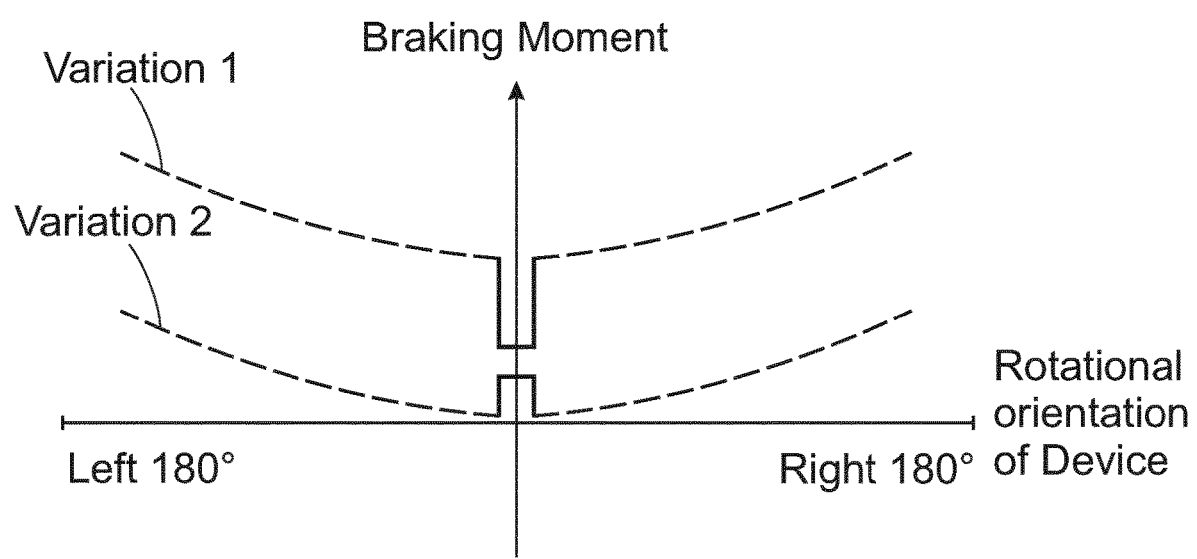
FIG. 4 a diagram of a braking moment applied by the magnetorheological actuator at low speeds with respect to a rotational angle of the rotary control device with respect to a primary orientation.

FIG. 4 shows a diagram of a braking moment applied by the magnetorheological actuator at low speeds with respect to a rotational angle of the rotary control device 1 with respect to a primary orientation. When the rotational angle of the user interface surface and/or rotatable part of the actuator is such that it corresponds to a central wheel alignment, i.e. an alignment along the forwards-reverse axis of the vehicle, the a jump in the braking force applied by the actuator is implemented. This jump in the braking force permits an operator to receive a haptic feedback regarding the orientation of the rotary control device corresponding to this central alignment.

In a first variation show above in the diagram, a braking moment applied when the wheels are not aligned with the forwards-reverse axis is interrupted and decreased when the rotary control device is rotated to the primary orientation. An operator of the vehicle therefore feels the user interface surface release to move more freely at and around this orientation.

In a second variation shown below in the diagram, the braking moment applied when the wheels are not aligned with a the forwards-reverse axis is increased quickly when the rotary control device is rotated to or approaches the primary orientation. An operator of the vehicle therefore feels the user interface surface lock or latch into the primary orientation.

REFERENCE CHARACTERS

1 Rotary control device
3 user interface surface
5 housing
7 rotational axis
9 sensor unit
11 processing unit
13 communications interface
15 substrate/PCB
17 assembly for generating/manipulating magnetic field
19 chamber
21 magnetorheological fluid
23 rotational element
25 servo actuator
27 spring element
29 attaching element
X1 first direction
X2 second direction
P1 first position
P2 second position
P3 third position

The invention claimed is:

1. Rotary control device (1) for steering a vehicle, comprising a magnetorheological actuator (17, 19, 21, 23) for manipulating a braking moment of the magnetorheological actuator incident on a rotatable part of the rotary control device, wherein the magnetorheological actuator is embodied to manipulate the braking moment on the basis of vehicle state information received by the device, such that when the vehicle is moving at a velocity less than a predetermined velocity and traction guiding parts of a vehicle are aligned with a forward-reverse axis of the vehicle, a change in the braking moment is reduced or increased via the magnetorheological actuator.

2. Rotary control device according to claim 1, comprising a user interface surface that is embodied to rotate with respect to a housing of the device around a rotational axis of the device, further comprising a sensor unit (9) for monitoring the orientation and/or rotational movement of the user interface surface with respect to the housing, a processing unit, and a communications interface serving to transmit control signals according to an output from the processing unit and to receive vehicle state information, said output being generated by the processing unit (11) at least on the basis of sensor data from the sensor unit, wherein the magnetorheological actuator (17, 19, 21, 23) has a rotational element that is mechanically connected to the user interface surface, wherein the user-torque required to rotate the user interface surface is dependent on a braking moment applied to the rotational element, said braking moment being dependent on properties of a magnetic field applied in the magnetorheological actuator (17, 19, 21, 23), wherein the magnetorheological actuator (17, 19, 21, 23) is embodied to generate and/or manipulate the properties of the magnetic field according to governing signals from the processing unit, and wherein the processing unit generates the governing signals (Gs) on the basis of vehicle state information received by the communications interface.

3. Rotary control device (1) according to claim 2, wherein the processing unit (11) is embodied to output the governing signals (Gs) for governing the assembly (17) for generating and/or manipulating the properties of the magnetic field on the basis of sensor data (Ds) from the sensor unit (9).

4. Rotary control device (1) according to claim 2, wherein the sensor unit (9) of the device (1) further comprises a sensor for monitoring the torque applied to the user interface surface (3).

5. Rotary control device (1) according to claim 2, wherein the sensor unit (9) of the device (1) further monitors the acceleration of the rotational movement of the user interface surface (3) with respect to the housing (5).

6. Rotary control device according to claim 2, wherein a spring element (27) provided, and in that a connecting element (29) is provided serves to detachably connect the user interface surface (3) with the housing (5) via the spring element (27) when the rotary control device (1) is in a steering mode, such that a rotational force applied to the device (1) externally is stored in the spring element (27) and when the external force is removed, the energy is released as a rotational force for rotating the user interface surface (3) back to the primary position.

7. Rotary control device (1) according to claim 2, wherein the processing unit (11) generates said governing signals (Gs) based at least partially on vehicle state information regarding vehicle velocity, acceleration, and/or traction guiding part position, wherein the communications interface (13) is embodied to receive said vehicle state information and provide the information to the processing unit (11).

8. Rotary control device (1) according to claim 1, wherein the processing unit (11) is embodied to generate said governing signals based at least partially on sensor information (Ds) generated by the sensor unit (9) regarding a variation of the orientation of the user interface surface (3) from the primary orientation of the user interface surface (3).

9. Rotary control device (1) according to claim 1, wherein when a torque is applied externally to the user interface surface (3) for rotating the user interface surface (3) relative to a housing (5) of the device (1) to an orientation varying from the primary orientation, the processing unit (11) generates governing signals (Gs) such that the magnetorheological actuator (17, 19, 21, 23) generates and/or manipulates the properties of the magnetic field to increase the torque transfer between the user interface surface (3) and the housing (5).

10. Rotary control device (1) according to claim 1, wherein the rotary control device (1) further comprises a servo actuator (25) that is embodied to apply torque directly and/or indirectly to the user interface surface (3) in accordance with said governing signals (Gs) output by the processing unit (11).

11. Rotary control device (1) according to claim 10, wherein when a torque is applied externally to the user interface surface (3) for rotating the user interface surface (3) to an orientation varying from the primary orientation, the servo actuator (25) serves to apply a torque in a direction opposite of the rotational movement, in a rotational direction of the primary orientation, such that when the manually applied torque is removed, the user interface surface (3) rotates to the primary orientation.

12. Rotary control device (1) according to claim 1, wherein the rotatable part of the device (1) rotates relative to a housing (5) of the device (1) around a rotational axis of the device (1), and wherein the magnetorheological actuator (17, 19, 21, 23) comprises a rotational element (23) that is mechanically connected to the user interface surface (3) and serves to interact with a magnetorheological fluid (21) of the magnetorheological actuator, and wherein the magnetorheological actuator comprises an assembly (17) for generating and/or manipulating properties of a magnetic field acting on the magnetorheological fluid (21) for modulating torque transmission between the user interface surface (3) and the housing (5).

13. Rotary control device (1) according to claim 12, wherein the rotational element (23) comprises a chamber (19) containing the magnetorheological fluid (21), and in that a static element is provided, which is fixedly arranged with respect to the housing (5) and arranged at least partially within the chamber (19), such that the torque transmission between inner surface of the chamber (19) of the rotational element (23) and the static element is dependent on the properties of a magnetic field.

14. Rotary control device (1) according to claim 12, wherein the rotational element (23) is embodied to rotate within a chamber (19) of the actuator containing the magnetorheological fluid, said chamber (19) being fixedly arranged with respect to the housing (5), such that the torque transmission between the rotational element (23) and an inner surface of the chamber (19) is dependent on the properties of a magnetic field.

15. Rotary control device according to claim 1, wherein the traction guiding parts of the vehicle are vehicle wheels.

16. Rotary control device according to claim 1, wherein magnetorheological actuator increases or decreases the change in the braking moment to communicate to a vehicle operator that the traction guiding parts of a vehicle are aligned with a forward-reverse axis of the vehicle.

17. A rotary control device (1) for steering a vehicle, comprising:
a housing (5);
a user interface (3) rotatable about a rotational axis (7) relative to the housing (5) to effect turning of vehicle wheels;
a chamber (19) in the housing contains a magnetorheological fluid (21);
a rotational element (23) in the chamber (19) and mechanically connected to the user interface (3) so as to be rotatable with the user interface (3); and
an assembly (17) for generating and manipulating a magnetic field in the chamber (19) to adjust the viscosity of the magnetorheological fluid (21), the viscosity of the magnetorheological fluid (21) applying a braking moment to the user interface (3) via the rotational element (23), the assembly (17) manipulating the braking moment to communicate to a vehicle operator that the user interface (3) is at a rotational position that corresponds to an alignment of the vehicle wheels with a forward-reverse axis of the vehicle when the vehicle is moving at a velocity less than a predetermined velocity and the rotational position of the user interface (3) corresponds to the alignment of the vehicle wheels with the forward-reverse axis of the vehicle.

18. The rotary control device according to claim 17, wherein the assembly (17) sharply increases or decreases the braking moment to communicate to the vehicle operator that the user interface (3) is at the rotational position that corresponds to the alignment of the vehicle wheels with the forward-reverse axis of the vehicle.

19. The rotary control device according to claim 17, further comprising a spring element (27) and a connecting element (29) that detachably connects the user interface surface (3) to the housing (5) via the spring element (27) when the rotary control device (1) is in a steering mode, a rotational force applied to the user interface (3) being externally stored in the spring element (27) such that when the external force is removed, the stored energy is released as a rotational force for rotating the user interface surface (3) back to the rotational position that corresponds to the alignment of the vehicle wheels with the forward-reverse axis of the vehicle.

20. The rotary control device (1) according to claim 17, further comprising a servo actuator (25) that applies a torque to the user interface (3) to rotate the user interface (3) back to the rotational position that corresponds to the alignment of the vehicle wheels with the forward-reverse axis of the vehicle after the user interface (3) is rotated away from the rotational position that corresponds to the alignment of the vehicle wheels with the forward-reverse axis of the vehicle.

* * * * *